INVENTORS.
JOHN R. HOWE
JOSEPH J. COOK

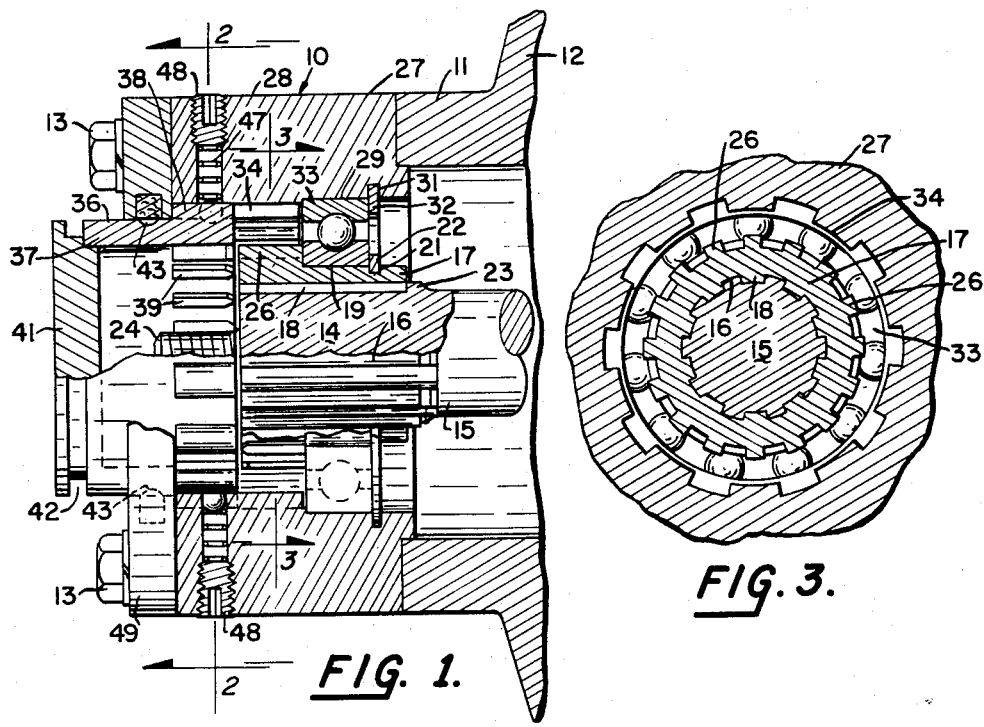

2,948,557

SELECTIVE DRIVE CLUTCH MECHANISM

John R. Howe, 2135 Meade St., and Joseph J. Cook, 1064 Adams St., both of Denver, Colo.

Filed June 25, 1956, Ser. No. 593,745

1 Claim. (Cl. 287—53)

The present invention relates to a selective drive clutch mechanism adapted for use in conjunction with vehicles having "four-wheel" or other type auxiliary drives. While being adaptable to other types of auxiliary drive arrangements, the present invention is particularly adapted for use on the front wheel or auxiliary drive system of "Jeep" type vehicles.

A main object of this and of other prior inventions has been to provide means for uncoupling the drive connection between the front drive axles and the front wheels, so that rotation of the auxiliary drive mechanism, inclusive of front axles, differential, drift shaft, etc., does not occur when such front drive mechanism is disengaged from the engine.

Figure 4:
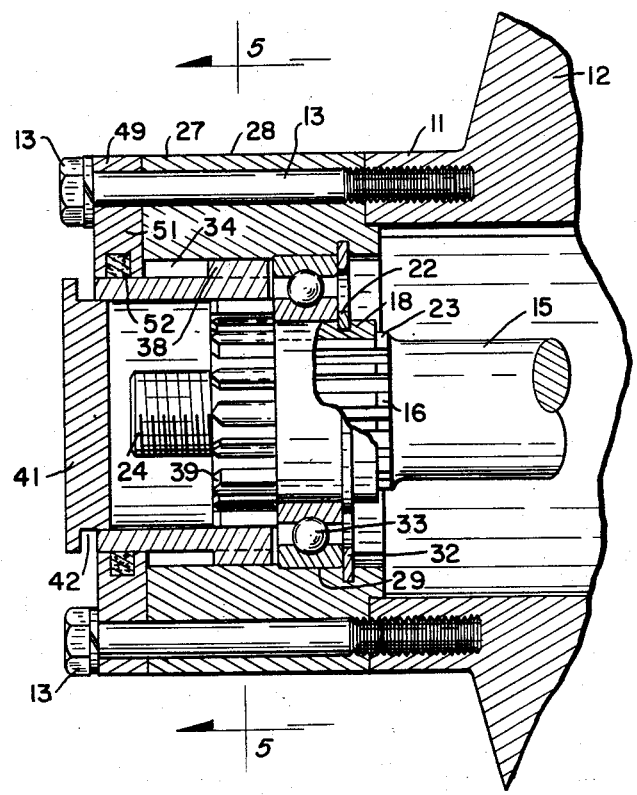
Figure 5:
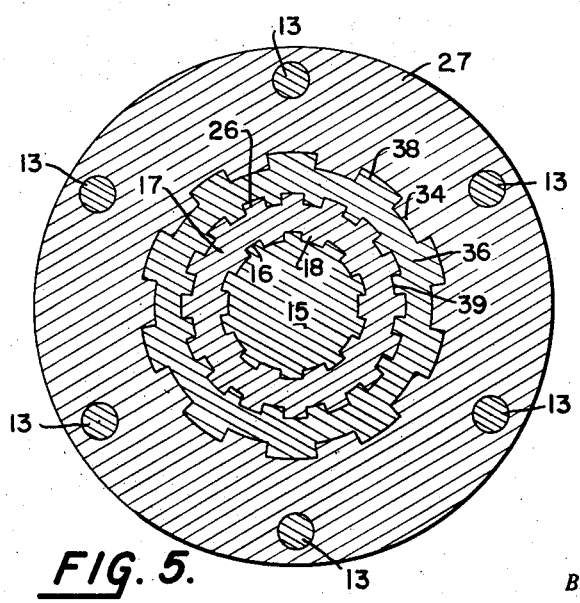

In order to satisfy the main object set forth, the present inventor has been guided by additional objectives worthy of separate mention. Among the additional objectives guiding development of the present invention are the following: To provide a selective clutching mechanism for auxiliary drive mechanisms that is sturdy, compact and rugged; to provide a selective clutching mechanism that incorporates a positive acting coupling device intermediate the drive axle and wheel; to provide a clutching mechanism of the foregoing type incorporating a bearing member for multi-directional rotation intermediate the drive axle and the wheel; to provide means for readily moving the coupling member to selected engaged or disengaged positions. Further objects and adavntages of the present invention will be apparent from the appended description and drawings, in which Fig. 1 is an elevation in partial section showing features of the present invention in disengaged relation, Fig. 2 is a cross-sectional elevation taken along line 2—2 of Fig. 1, Fig. 3 is a cross-sectional elevation taken along the line 3—3 of Fig. 1, Fig. 4 is an elevation in partial cross-section showing further features of the present invention and showing the device in the engaged position, and Fig. 5 is a cross-sectional elevation taken along the line 5—5 of Fig. 4, showing elements of the device in engaged position.

Briefly stated, the present invention provides a clutching mechanism adapted for operation intermediate a drive axle of an auxiliary drive vehicle and the wheels associated therewith, so that the drive connection between the wheels and axle may be selectively engaged or disengaged as desired. The major elements include a bearing positioned intermediate the clutching mechanism housing and the driven axle to assure free rotation between these parts when the clutching mechanism is in the disengaged position. A second major component is a clutching member splined internally and externally for selective engagement with the driven axle and the clutch mechanism housing to provide positive drive therebetween when in the engaged position.

Referring now to the drawings, the detailed features of the present invention will be more clearly understood with reference to the drawings. In Fig. 1 a clutch member 10 is shown mounted on the hub 11 of wheel 12 by means of cap screws 13 or the like to enclose the end 14 of axle 15. As will be obvious from the inter arrangement of the parts named, the wheel 12 can only be caused to rotate with the axle 15 when some element or elements is interposed in between the splines 16 on the end 14 of the axle shaft 15 and the hub 11 of wheel 12. In conventional "Jeep" drive arrangements the desired connection between these elements is obtained by a hub cap (not shown) directly and positively interconnecting the axle 15 and hub 11. However, it has been found that it is highly desirable to interpose a disconnect feature between the axle and wheel. This is true because it is not necessary at all times to use the auxiliary drive system or the front wheel drive mechanism on the ordinary "Jeep." If the drive connection between the wheel 12 and axle 15 can be interrupted, the wheel 12 will rotate freely on the wheel bearings provided (not shown) without causing rotation of the axles 15, the front differential (not shown), the auxiliary propeller shaft (not shown) and driven members in the auxiliary transmission (not shown).

Operation of vehicles having auxiliary drive arrangements have been observed to be considerably more satisfactory on smooth highways when the auxiliary drive wheels are allowed to rotate freely and independently of the drive mechanism. Further, such selective disconnection of the drive mechanism and the wheels effects a considerable saving in wear of parts, friction losses, etc.

To obtain the desired disconnect features, the present invention provides a hub member 17 having internal splines 18 for cooperative engagement with the splines 16 on axle 15 and an outer surface, one-half of which is of smooth cylindrical shape, to provide a bearing support face 19. Bearing face 19 further provides an annular groove 21 adapted to receive snap retainer ring 22. The end of the hub 17 disposed away from bearing face 19 and axle 15 is provided with splines 26 on its outer cylindrical face, and hub member 17 is itself held securely on the shaft in desired position against shoulder 23 by a nut (not shown) which engages the threaded stub end 24 of the axle 15.

In order to hold the end 14 of axle 15 in proper position, a housing 17 is provided which is essentially an open cylindrical structure having a smooth exterior face 28 corresponding in size to the size of the hub 11 of wheel 12. Internally the housing 27 provides through approximately one-half its length a smooth face 29 having an annular groove 31 cut therein and adapted to receive a snap retainer ring 32. With this arrangement a ball or other type bearing member 33 may be interposed between the internal face 29 of housing 27 and the external bearing face 19 of the hub 17 to be retained in such position by the snap rings 22 and 32. With the bearing 32 so positioned it will be observed that wheel 12 and housing 27 will be free to rotate about the axle and hub 17.

To facilitate selective interconnection between hub 17 and housing 27, the remainder of the inner face of the housing 27 is provided with splines 34 to complete the assembled structure substantially corresponding to that shown in Fig. 3. From this figure it will be seen that if it is desired to interconnect the axle 15 and associated hub 17 with the encompassing housing 27, it is merely necessary to interpose a member that will at the same time engage the splines 26 of hub 17 and the splines 34 of housing 27. The element used to selectively accomplish this result is a slide clutch member 36, the features of which are shown in Figs. 1, 2 and 4. In these figures the barrel cylindrical structure 37 of slide member 36 is shown to be provided with a plurality of external splines 38 adapted for cooperative engagement with the splines 34 of housing 27 and internal splines 39 adapted for cooperative engagement with the external splines 26 of hub 17. When it is desired to engage the drive connection between the axle 15 and the wheel 12, slide member 36 may be moved reciprocally inwardly along the splines 34 of the housing 27 until the internal splines 39 come into engagement with external splines 26 of hub 17, as shown in Figs. 4 and 5. In these figures it will be observed that when the drive connection is complete, the axle 15 will rotate with the wheel 12 or conversely when the axle 15 is rotated, as when the auxiliary drive is engaged, the wheel 12 will be caused to rotate.

To facilitate shifting of the slide member 36 to and from engaged positions and further to enclose all the working parts within the housing, a cap 41 is provided to close off the open end of slide 36. Preferably cap 41 and slide 36 are of cooperative size and shape to provide an open annular groove 42 into which a tool (not shown) may be engaged to facilitate reciprocal movement of the slide 36. To hold the slide in selected position the invention provides detents 43 in the external face of the slide 36, which will be engaged when in selected positions by a ball 44 positioned in drilled opening 46 of the hub 17 and held therein by a spring member 47. To further close off the housing 27, a face plate 49 is provided which is held on the housing by the cap screws 13. As shown in Figs. 1 and 4 the face plate 49 has an internal annular groove 51 cut therein and adapted to receive a grease retainer seal 52 which closely engages the outer surface of slide member 36 to prevent the loss of grease or other lubricant from the housing 27.

What is claimed is:

A clutch unit for use on the auxiliary drive assembly of multiple axle drive vehicles to selectively interconnect an auxiliary drive axle and a wheel thereon comprising a hub member secured to the said axle and providing through a portion of its length an external cylindrical surface, splines on said hub member raised above said external cylindrical surface and providing a shoulder at the end of said splines, a housing secured to said wheel and providing through a portion of its length an internal cylindrical surface in position aligned with the first named cylindrical surface and radially spaced therefrom, splines on said housing raised above said internal cylindrical surface in position aligned with the splines on said hub member and further providing a second shoulder at the end of said splines, a non-directional free turning bearing having inner and outer race elements respectively engaging the external cylindrical surface of said hub member and the internal cylindrical surface of said housing for holding said members in spaced apart free turning relation, said bearing and all of said splines being cooperatively designed such that the total height of said splines above the respective cylindrical surfaces is less than the radial thickness of the bearing separating said surfaces whereby said splines are maintained in out-of-contact relation, said cylindrical surfaces further providing cut annular grooves disposed in axially aligned positions adjacent the respective race elements of said bearing, snap rings in said grooves for engagement with the inner and outer race elements of said bearing for holding said bearing in position and against said shoulders whereby said drive axle, hub member, housing and all of said splines will be maintained in assembled and aligned relation, reciprocal means movable to alternate positions for selectively interconnecting the splines of said hub member and housing when it is desired to interconnect the drive axle and said wheel and for disconnecting said splines when free rotation of the wheel on said bearing and about said drive axle is desired, said housing providing an opening aligned with said drive axle and hub member, and an extension on said reciprocal means extending out of said opening for movement with said reciprocal means whereby actuating movement of said extension is useful to selectively engage or disengage said reciprocal means.

References Cited in the file of this patent

UNITED STATES PATENTS

| 2,476,586 | Darash | July 19, 1949 |
| 2,684,140 | Warn | July 20, 1954 |
| 2,727,371 | Troeger et al. | Dec. 20, 1955 |
| 2,735,528 | Dodge | Feb. 21, 1956 |
| 2,788,103 | Requa | Apr. 9, 1957 |

FOREIGN PATENTS

| 913,969 | Germany | June 28, 1954 |